May 23, 1967 C. G. MANN 3,321,704
APPARATUS FOR MONITORING DEVIATIONS FROM PRODUCTION STANDARDS
Filed Sept. 14, 1962 2 Sheets-Sheet 1
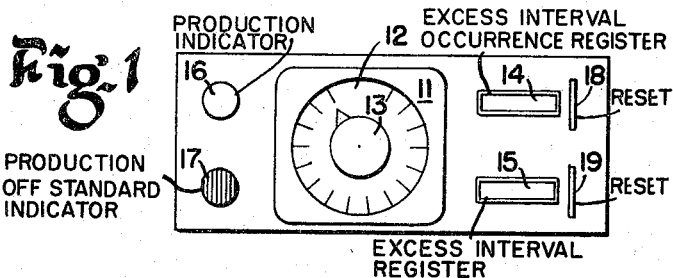
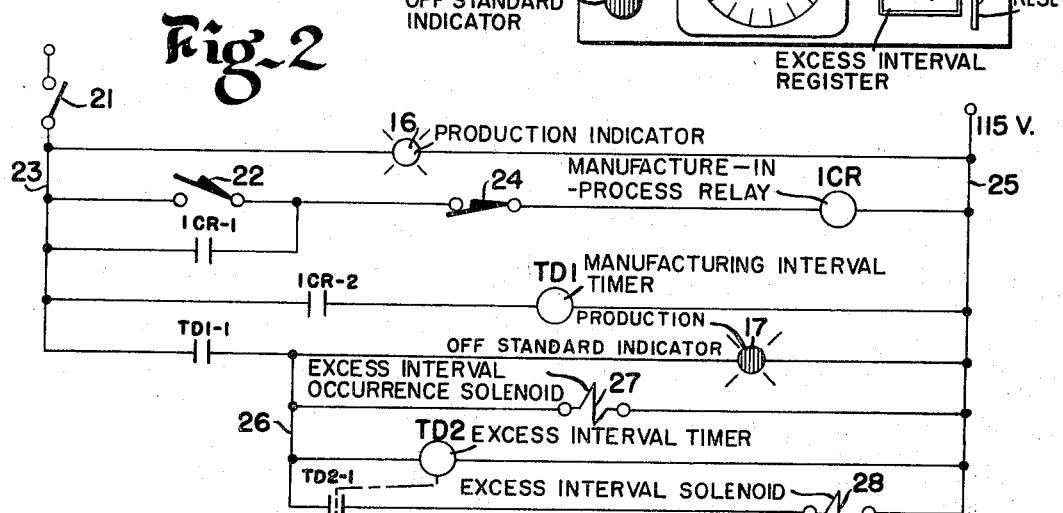
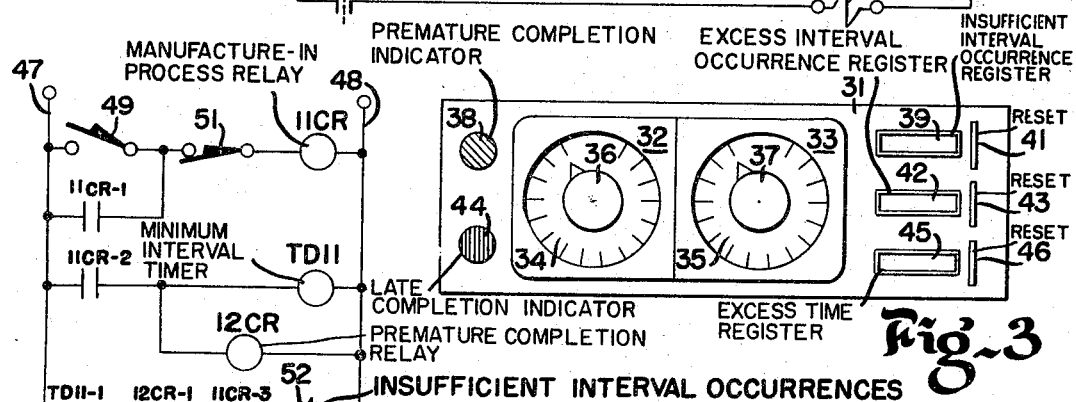
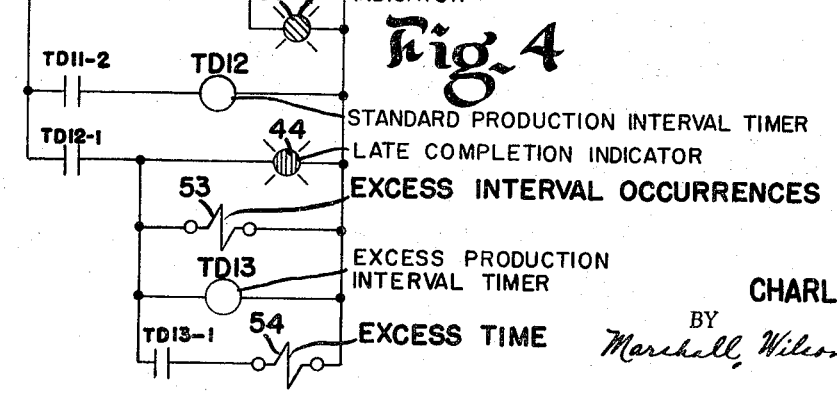
INVENTOR.
CHARLES G. MANN
BY
Marshall, Wilson, Click & Yeasting
ATTORNEYS ated May 23, 1967

United States Patent Office 3,321,704
Patented May 23, 1967

3,321,704
APPARATUS FOR MONITORING DEVIATIONS FROM PRODUCTION STANDARDS
Charles G. Mann, Farmington, Mich., assignor to Weltronic Company, Southfield, Mich., a corporation of Michigan
Filed Sept. 14, 1962, Ser. No. 223,655
3 Claims. (Cl. 324—68)

This invention relates to production control equipment and more particularly to equipment for monitoring industrial processes or manufacturing operations to ascertain deviations therein from predetermined standards.

Frequently it is desirable in instituting a new manufacturing operation to ascertain a standard time within which the operation should normally be completed in order that production schedules, cost studies and general evaluation of the operation can be intelligently undertaken. In certain operations, such as those involving the molding of plastic materials, limits are imposed upon the curing process requiring that a certain minimum cure time be allocated to the process and further requiring that a maximum cure time be imposed to avoid over-curing. Deviations from the range of intervals falling between the minimum and maximum time should be indicated both to the machine attendant and to management. Where standards have been or are being established management functions can be enhanced by indicating the reason for an operation falling outside of the acceptable range of intervals.

In accordance with the present invention apparatus is provided which establishes a predetermined operating interval or a suitable range for the operating interval and which, upon occurrence of an operation falling outside of the limits of the interval allocated for the operation, indicates the occurrence as upon a register. As an adjunct the amount of deviation in the actual interval from the assigned standard interval can also be measured automatically and in certain instances provisions can be made for the attendant at the working station to indicate the reason as he views it for the deviation from standards. This apparatus is arranged so that the information can be registered and displayed on dials either at the work station or at a central station or both, or can be recorded as on a synchronously driven paper tape bearing a pen trace which signifies the working time of the machine, the number of operations performed within standards, deviations from standards and the reasons for such deviations.

One object if this invention is to facilitate the control of manufacturing operations.

Another object is to indicate deviations from predetermined standards in manufacturing operations.

Another object is to indicate the number and/or degree of deviation from predetermined standards in manufacturing operations.

A further object is to correlate with deviations from manufacturing standards, the reasons for such deviations, advantageously in a permanent record.

In accordance with the above objects, one feature of the invention resides in a combination of apparatus for comparing the interval required to perform a manufacturing operation with a predetermined standard interval and for measuring the deviation therefrom. In repetitive operations the number of occurrences in which a deviation from the standards occurs is ascertained as well as the accumulated time deviation, whereby the validity of a preselected standard interval can be evaluated.

Another feature resides in the combination of means for establishing upper and lower limits on a standard interval for a manufacturing operation and ascertaining those operations which fall outside of the limits and the degree of deviation therefrom.

A third feature resides in signaling means available to a production worker for indicating reasons for deviating from a standard operation interval and remote signaling and recording means for said reasons.

The above and additional objects and features of this invention will be more fully appreciated from the following detailed description when read with reference to the accompanying drawings wherein:

FIG. 1 is a front view view of a control panel for establishing a standard manufacturing operation interval limit, for indicating the number of occurrences that the limit is exceeded, and for indicating the time by which the limit is exceeded;

FIG. 2 is a cricuit in across-the-line form for the apparatus of FIG. 1;

FIG. 3 is the front view of a control panel for apparatus defining the limits on an interval for a manufacturing operation, and for indicating the number of occurrences in which the lower limit of that range is not achieved, the number of instances in which the upper limit is exceeded and the amount of time by which the upper limit is exceeded;

Figure 5:
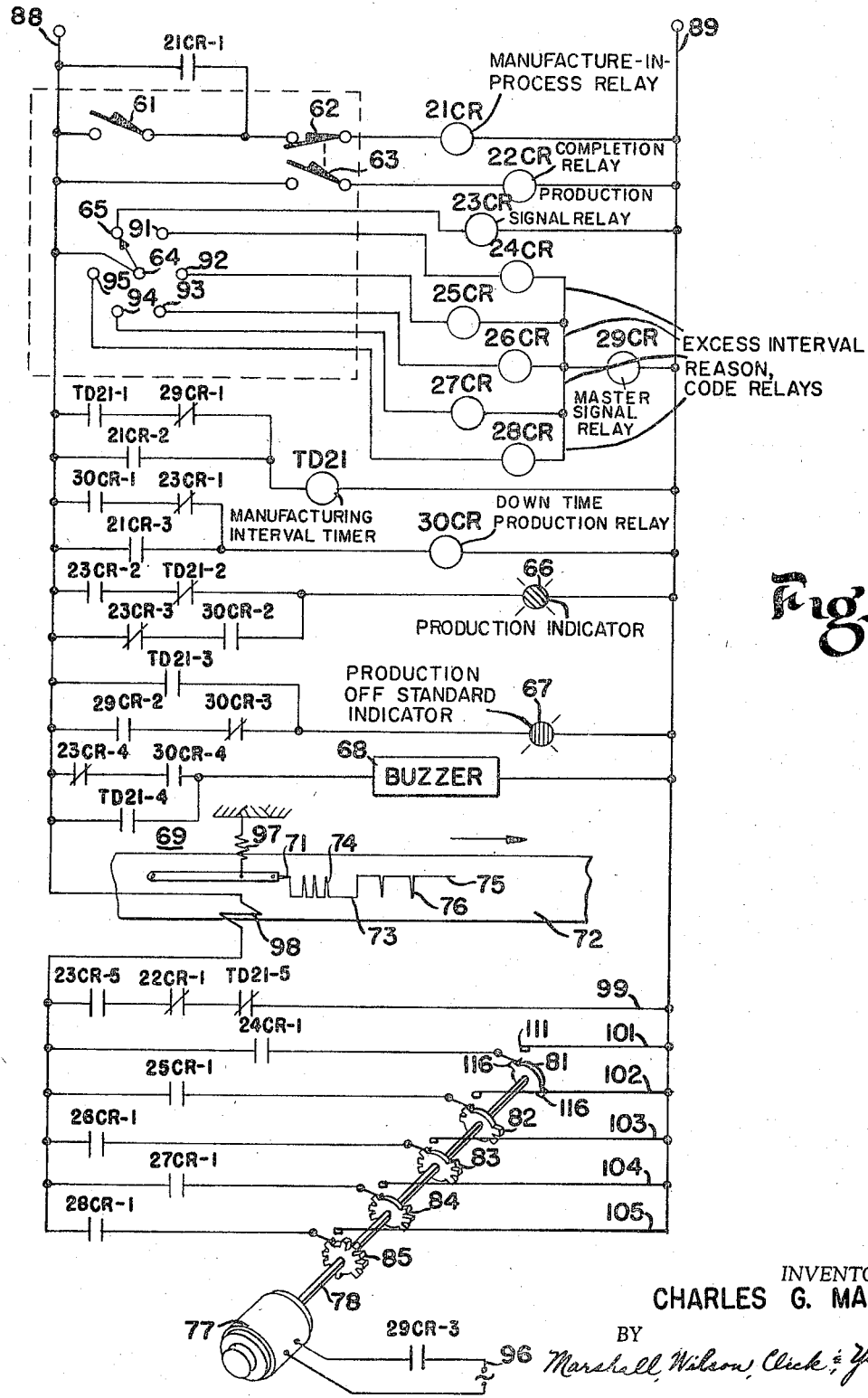

FIG. 4 is a circuit diagram in across-the-line form for the apparatus illustrated in FIG. 3; and FIG. 5 is a circuit diagram in across-the-line form for a system which indicates the occurrence of a manufacturing operation interval in excess of a standard, which alters conditions at the work station to induce the attendant to indicate the reason for the deviation in the operating interval from standards, which operates appropriate alarms and indicators and which records operations within limits, operations outside of limits and the reasons for the deviations thereof.

The production interval monitoring system illustrated in FIG. 1 comprises a timer 11 including a dial 12 bearing suitable indicia and a rotatable pointer 13. Timer 11 can be of any of a number of commercially available types which are electrically driven to actuate a contact an adjustable interval following their actuation. It also includes an excess interval occurrence register 14 which registers the number of instances in which a manufacturing operation exceeds a standard established in the timer 11 and an excess interval register 15 which registers the amount of time in excess of the standard interval which is consumed in performing the manufacturing operations. Signal lamps 16 and 17 are provided to indcate the state of operation at the work station and at the control station as by lighting a green indicator 16 when the work station is assigned a production status and the central station is conditioned to monitor that production, and a red lamp 17 which can be illuminated during the intervals production deviates from the standard intervals. Another adjunct to the system comprises the reset wheels 18 and 19 functioning in a conventional manner to reset the register wheels of registers 14 and 15 when manipulated manually.

In operation, the system shown in the panel of FIG. 1 has the timer adjusted to an interval defining an upper limit for a manufacturing operation. Initiation of the operation actuates the timer which begins to define the limiting interval standard. In the event the manufacturing operation is completed before the standard interval expires, the timer is reset and the equipment on the control panel remains dormant. If, however, the manufacturing operation is not completed, upon expiration of the predetermined interval the occurrence register 14 is actuated to count a manufacturing operation requiring more than the predetermined standard interval and the red lamp 17 is illuminated until the operation is completed. The timer is then reset and the lamp extinguished. The interval occurring between the end of the standard interval and the completion of the operation is measured by a secondary timer. This excess interval is periodically registered on register 15 advantageously in increments of 1/100 of an hour.

The circuitry for providing the above operations appears in FIG. 2. The control panel of FIG. 1 and the equipment associated therewith can be located at the machine station, at some centralized supervisory position remote from the work station or can be duplicated at least with regard to the timers and signal lamps, at a plurality of locations. It is conditioned for operation by the closing of line switch 21 to illuminate the lamp 16 and partially enable the remainder of the circuit. A switch 22 is provided which can be closed upon the initiation of a manufacturing operation which is to be monitored. This switch might be operated manually although it is preferable that it be actuated automatically as by operation through motion of a machine element closing a limit switch at the beginning of the interval to be measured, by a photoelectric cell sensing the passage of a piece part into an operating station, or by other known means for sensing a state at the work station indicative of the initiation of the operating interval. Closure of switch 22 connects line 23 from a suitable source of power (not shown) through normally closed switch 24 which is opened manually, mechanically or photoelectrically, for example, in the manner of switch 22 as the manufacturing operation is completed, to the actuating coil of manufacture-in-process relay 1CR and thence to line 25 connected to the power source. Thus upon initiation of a manufacturing operation relay 1CR picks up and closes its contacts 1CR-1 to seal itself in. It also closes contact 1CR-2 to initiate the operation of manufacturing interval timer TD1 defining the standard manufacturing interval for the operation. Upon completion of the operation, switch 24 is opened to deenergize relay 1CR, opening its seal circuit and opening the circuit through 1CR-2 for timer TD1 from leads 23 and 25. Under these circumstances the lamp 16 continues to glow and otherwise the system remains dormant with the exception that the timer is reset.

If the interval defined by TD1 expires before the switch 24 is opened by the completion of an operation, contact TD1-1 is closed to connect the source on lead 23 to lead 26 thereby energizing lamp 17 and the excess interval occurrence solenoid 27 driving the occurrence register to cause register 14 to advance one step. Solenoid driven registers are well known and therefore the details of their construction coupling solenoid 27 to register 14 and excess interval solenoid 28 to register 15 are not shown. Lamp 17 remains energized until the manufacturing operation is completed. At this time, excess interval timer TD2 is energized to begin timing the inerval by which a manufacturing operation exceeds the predetermined standard interval. Timer TD2 may be motor driven by virtue of energization through leads 23 and 25 to periodically close contacts TD2-1 for example, once each 36 seconds (each 1/100 of an hour) to energize solenoid 28 at the end of each period and advance register 15 one count.

The system of FIGS. 1 and 2 can be utilized to establish a standard interval by virtue of the adjustability of the timing interval defined by timer TD1, for example, an operation might be initially estimated to require 16 seconds. The timer would be set for a 16 second interval plus a reasonable allowance, perhaps an additional second for a total of 17 seconds, and applied to monitor the operation. If by virtue of register 14 the system indicated that a substantial number of operations exceeding the allowable standard occurred, this would be indicative of an insufficient allowance for the operation. The degree of this insufficiency would be indicated by the amount of excess time registered on register 15. For example, if 90% of the operations exceeded the standard and the average extra interval required was three seconds the standard could be re-established with a limit of twenty seconds and again applied to the operation. Conversely if none of the operations exceeded the standard, this would be indicative of an excessive interval allowance and the interval would be reduced by some appropriate amount and the operation again monitored. Once a standard has been established in which an acceptable percentage of the operations exceed the predetermined interval and the excess intervals are of a reasonable level for those operations, the system can continue to be applied to the operation with the timer set to this standard to monitor the effectiveness of the plant in performing the operation and the efficiency of the workmen assigned to the operation.

FIG. 3 illustrates a control panel 31 having timers 32 and 33, which may be of the same type as timer 11, respectively establishing lower and upper limits for a range of tolerable operating intervals for a manufacturing operation. Each of the timers is supplied with an indicia-bearing dial 34 and 35 and a pointer 36 and 37. If the cycle is completed prematurely so that the standard interval defined by timer 32 has not expired, premature completion indicator, a color coded lamp 38, is momentarily illuminated and insufficient interval occurrence register 39 having reset wheel 41 is advanced one position. The timer is then reset to condition the equipment for monitoring subsequent operations.

If the manufacturing operation is completed subsequent to the definition by timer 32 of the minimum interval, the register 39 and lamp 38 on the panel 31 remains dormant. At completion of the interval defined by timer 32 the standard production timer 33 is initiated in its timing interval.

Completion of the operation before the end of the interval defined by timer 33 resets timer 32 which causes timer 33 to be reset and no further change occurs on panel 31.

If the manufacturing operation is not completed until after the expiration of the interval defined by timer 33, at the time timer 33 times out the occurrence of an operation requiring an excess interval is registered on excess interval occurrence register 42 having reset wheel 43, and late completion indicator, the color coded lamp 44, is illuminated until the next manufacturing operation is initiated. The amount of time in excess of the interval defined by timer 33 is registered on excess time register 45 having reset wheel 46. This register functions in much the same manner as register 15 of FIG. 1 in that it accumulates the excess time through the operation of a motor driven timer which advantageously functions on a base interval of 1/100 of an hour.

The circuit for the equipment of FIG. 3 appears in FIG. 4. It is supplied by a suitable source of power connected across leads 47 and 48 and if desired can be provided with a line switch and pilot lamp as 21 and 16 respectively of FIG. 2. Switches 49 and 51 indicating the initiation and completion of the manufacturing operation being monitored are ordinarily located at the work station and may be actuated either manually by the attendant or automatically by the machine as by cam actuation, photoelectric sensing or the like known equipment functioning at appropriate points in the operating cycle as described for switches 22 and 24 of FIG. 2. Upon initiation of an operation, switch 49 is closed to connect energized lead 47 through 49, normally closed switch 51, actuating coil of manufacture-in-process relay 11CR to lead 48. Relay 11CR seals itself in by closing contact 11CR-1. It initiates the timing function of minimum interval timer 32 by energizing timing motor TD11 of that timer placed in circuit across leads 47 and 48 by the closure of contact 11CR-2, and it opens normally closed contact 11CR-3, without effect at this time inasmuch as contact 12CR-1 in series therewith remains open until its actuating coil 12CR is energized by the closure of contact 11CR-2. Premature completion relay 12CR functions to indicate a premature completion of the manufacturing operation. It is of the slow release type and by virtue of this characteristic functions to enable energization of solenoid 52, driving register 39 as in the case of solenoid 27 and register 14, and lamp 38 only in the event the manufacturing operation is completed prematurely. Timer 32 has normally closed contacts TD-11 which open at the end of its pre-adjusted interval in the energizing circuit for solenoid 52 and lamp 38. It has normally open contacts TD11-2 in the energizing circuit for timer motor TD12 of timer 33, whereby upon definition of the minimum operating interval by timer 32, definition of an acceptable period for the completion of the manufacturing operation is initiated by standard production interval timer 33. Contacts TD12-1 of timer 33 close when the acceptable interval has been exceeded by the operation to connect lamp 44, excess interval occurrences register solenoid 53 for register 42 and excess interval timer motor TD13 to the leads 47 and 48 and thus across the source of electrical energy. This results in the illumination of light 44, counts an additional excess interval, and initiates the measurement of that interval. Excess production interval timer motor TD13 periodically closes contacts TD13-1 to energize solenoid 54 for excess time register 45, whereby increments of excess time are accumulated in that register.

The operation of the system of FIGS. 3 and 4 can be applied to advantage in monitoring functions such as curing operations having lower and upper limits. At the initiation of the operation contact 49 is closed to energize relay 11CR which seals itself in through contacts 11CR-1 and begins the timing of timer 32 through the energization by contacts 11CR-2 of motor TD11. At this time slow release relay 12CR is energized by closure of contacts 11CR-2. Relay 12CR closes its contacts 12CR-1 after contacts 11CR-3 have opened and hence has no effect at this time. If the operation is completed before the interval established for timer 32 expires, so that contact 51 is opened to drop relay 11CR, contacts 11CR-2 are opened to cause the reset of timer TD11 and the deenergization of relay 12CR. Solenoid 52 and lamp 38 are energized for the dropout interval of relay 12CR under these circumstances inasmuch as normally closed contact TD11-1 remains closed, contact 12CR-1 was closed by the energization of relay 12CR and has not yet been released despite the deenergization of the actuating coil for that relay and normally closed contact 11CR-3 has closed upon the dropout of relay 11CR. At the end of the dropout interval of relay 12CR, an interval chosen to be of sufficient length to insure proper operation and indication by both the solenoid 52 and the lamp 38, contact 12CR-1 opens and the circuit is again prepared to monitor a manufacturing operation.

If the manufacturing operation interval falls within acceptable limits, that is subsequent to the interval defined by timer 32 and prior to the expiration of the timer 33, no response is indicated on the panel 31 except the reset of timers 32 and 33. The initiation of such a cycle energizes relay 11CR, operates timer motor TD11 through its cycle to open contacts TD11-1 at the end of the interval set on timer 32, without effect inasmuch as contacts 11CR-3 are open, and closes contacts TD11-2 to initiate operation of timer motor TD12. During the timing of motor TD12 and before its contact TD12-1 is closed, switch 51 is opened to deenergize relay 11CR. This causes the reset of the fully timed out motor TD11 and the reset of the partially timed out motor TD12 conditioning the system to monitor the next manufacturing operation. It should be noted with respect to the circuit including normally closed contacts TD11-1 and contacts 12CR-1 that the dropout interval of 12CR expires before contacts TD11-1 are reclosed whereby contacts 12CR-1 break the path which might otherwise be established when contacts TD11-1 close to prevent a false energization of solenoid 52 and lamp 38.

A manufacturing operation which exceeds the acceptable interval is completed subsequent to the timing out of motor TD12 and the closure of contacts TD12-1. Under these circumstances lamp 44 is lighted. Solenoid 53 is energized to advance register 42 and the timing motor TD13 begins to time the interval by which the operation interval exceeds the tolerable allowance. TD13 periodically closes its contact TD13-1 energizing solenoid 54 to register the time increment on register 45.

As was the case with the system of FIGS. 1 and 2, the system of FIGS. 3 and 4 can be used to establish standards for a manufacturing operation as well as to monitor the operation. Therefore the timers 32 and 33 are adjustable as to the intervals they define and the timing of TD13 as in the case of TD2 is cumulative for successive intervals so that while contact TD13-1 is closed only once every $1/100$ of an hour, portions of such a period can be accumulated for successive operations to give a true indication of the amount of time by which the overtime operations cumulatively have exceeded the allowable limits. Thus for example if an operation exceeded its limit by four seconds and one cycle of the actuator for the contact TD13-1 require 36 seconds that actuator would traverse essentially one-ninth of its cycle and upon completion of the operation would remain dormant in that position until the next interval exceeding its standard was detected.

Another embodiment of the invention illustrated in FIG. 5 can be utilized to alter conditions at the work station in response to an excessive operating interval in a manner to induce the attendant at the station to indicate the reasons for the excess interval. In this system the equipment located at the work station includes a switch 61 closed to indicate the initiation of the manufacturing operation, switches 62 and 63 opened and closed respectively to indicate the completion of the operation and a multi-position selector switch 64 transferable from a contact 65 when the machine is assigned to a "production" status to any of five additional contacts which are coded with respect to reasons as selected by the attendant for the operation exceeding the allowable standards. The system includes a production indicator, a signal lamp 66, which can be remote from the work station or can be duplicated at the work station and a remote station, which is illuminated during normal productive operation and is darkened when the operation exceeds the allowable interval. A production off-standard indicator, a signal lamp 67, located as lamp 66, is provided which is illuminated to indicate that an excess interval has occurred. An audible signal such as a buzzer 68 also located as lamp 66, is also actuated when the allowable interval is exceeded. A pen recorder 69, which can be located remote from the work station, including a pen 71 producing a trace on a tape 72 driven by a suitable clockwork of conventional form provides an indication of the assignment of the work station to production by virtue of the base line being displaced downward as at 73, indicates productive cycles by the excursions from the base 73 as at 74, indicates the transfer of the work station to down time by the trace 75 displaced upward on the tape 72 and indicates the coded reasons for the down time by the grouping of excursions in the trace from the down time base 75 as shown at 76. The decoding mechanism for actuating the pen comprises a suitable electric motor 77 having a shaft 78, driving cam wheels 81, 82, 83, 84 and 85 to give code groups of one, two, three, four and five pen excursions respectively in response to the displacement of the selector switch contact 64 to the first, second, third, fourth and fifth positions in a clockwise direction from the "production" contact 65.

A suitable source of electrical energy is supplied to the primary leads 88 and 89 of the circuit of FIG. 5. This source can be applied through a line switch corresponding to the switch 21 of FIG. 2 and the activation of the equipment can be indicated by a pilot lamp corresponding to the lamp 16. With power applied, upon initiation of a manufacturing operation switch 61 is closed in the manner discussed above for switches 22 and 49 to energize manufacture-in-process relay 21CR which seals itself in through the closure of contacts 21CR–1. This relay remains energized until the operation is completed and switch 62 is opened in a manner corresponding to the operation of switches 24 and 51. Switch 63 indicated as operating in unison with 62 by the dotted line extending from 62 momentarily connects completion relay 22CR across leads 88 and 89 at the completion of a manufacturing operation. This relay opens back contact 22CR–1 to cause a pen record of the completed production cycle to be made in a manner to be described.

A selector switch having a movable contactor 64 is located at the working station in order to enable the attendant to signal and record the state of affairs at that station. In the system illustrated the attendant is required to reposition the contactor 64 when the manufacturing operation interval exceeds the acceptable limit inasmuch as an alarm is operated and the response of the monitoring equipment is altered until such repositioning occurs. If desired, this function can be expanded to disable the machine until a coded reason has been entered into the equipment by the attendant. In normal production, contactor 64 engages stationary contact 65 to connect production signal relay 23CR across leads 88 and 89. This indicates that conditions at the work station are such that production can proceed. Energization of relay 23CR opens normally closed contact 23CR–1 to break the seal for down time production relay 30CR, closes the contact 23CR–2 to cause illumination of lamp 66 indicating that the system is conditioned at the work station for production, opens back contact 23CR–3 to interrupt the circuit around manufacturing interval timer contact TD21–1 in the energizing path for lamp 66, with no effect at this time, opens the back contact 23CR–4 in a circuit around the contacts of timer TD21 energizing signal 68 and closes contact 23CR–5 to displace the pen 71 to a position recording the productive state of the equipment.

Each of excess interval reason, code relays 24CR, 25CR, 26CR, 27CR and 28CR are individually operable in response to the displacement of the contactor 64 from stationary contact 65 to any of contacts 91, 92, 93, 94 or 95 respectively corresponding to reasons for the excessive manufacturing interval. Typical reasons for such delays as applied to a stamping operation are: need to clean die, need to dress die, need to change material, need to correct die alignment and need to change die. When any of relays 24CR–28CR are energized, they close a contact in the decoding circuits for the recording equipment at 24CR–1, 25CR–1, 26CR–1, 27CR–1 or 28CR–1 whereby the trace on the tape record is caused to periodically make a coded group of excursions from its down time base 75 as at 76 to indicate the reasons for the retarded operation. A master signal relay 29CR is energized in series with any of the signal relays 24CR to 28CR to open back contact 29CR–1 and release the seal circuit for timer TD21 to close contact 29CR–2 and enable an energizing circuit for lamp 67, and to close contact 29CR–3 in order to further condition the decoding section of the recording equipment by connecting electric motor 77 to a suitable source of energy 96.

In order to insure the indication of the reason for an excess manufacturing operation interval the attendant is alerted at the work station and, if desired, an indication is given at remote positions as by the actuation of suitable audible signals 68, the extinguishing of a color coded production signal lamp 66 and the illumination of a color coded excess time lamp 67, and the recording device 69 is shifted from a production trace 73 to a down time trace 75. This is accomplished by the timing out of timer TD21 following the initiation of its timing interval by the closure of contact 21CR–2 to connect it across leads 88 and 89. In the event that the manufacturing operation is completed before the complete definition of the interval for which timer TD21 is adjusted, switch 62 is opened momentarily to deenergize relay 21CR whereby contact 21CR–2 is opened and the timer is reset. At this time switch 63 is closed momentarily to connect completion relay 22CR across leads 88 and 89 and open back contact 22CR–1 to cause an excursion of pen 71 and record a production operation as at 74.

If, however, the operation interval exceeds the interval defined by TD21, TD21 actuates its contacts and maintains them actuated until contact 29CR–1 is opened by selection by the attendant of a reason for the excessive interval. Thus an operation interval exceeding the allocated interval closes contact TD21–1 to seal in TD21 until master signal relay 29CR is energized to open its back contacts 29CR–1 and operation interval relay 21CR is dropped. Ordinarily a manufacturing operation is completed before the reason for the excessive interval is selected; hence, 21CR–2 is opened prior to the opening of 29CR–1. Timer TD21 also opens contact TD21–2 to extinguish production signal lamp 66 which previously had been energized through closed contact 23CR–2 of the production signal relay and normally closed contact TD21–2 across leads 88 and 89. Contacts TD21–3 are closed to complete an energizing circuit for excess interval signal lamp 67 connecting that lamp across leads 88 and 89. Contact TD21–4 is closed to connect audible signal 68 across leads 88 and 89. Normally closed contact TD21–5 is opened to transfer the record trace from its production base at 73 to its down time base at 75 in the recording apparatus 69. These conditions are maintained until the attendant at the work station either signals the reason the operation exceeded the allocated interval or until production is again instituted by the machine following the completion of the current cycle by the closure of contact 61 to reenergize relay 21CR.

Following the timing out of TD21 and the normal completion of the then current manufacturing operation to drop relay 21CR, the attendant normally will displace movable contactor 64 to one of positions 91–95 corresponding to the reason which he assigns for the excessive interval. The second alternative would be to continue manufacturing operations. In the event operations are continued without assigning a reason, the monitoring equipment of FIG. 5 is not responsive. Since the closure of switch 61 and the energization of relay 21CR has no effect and the timer TD21 is held timed out by its seal circuit of TD21–1 and 29CR–1, production lamp 66 is extinguished since back contacts TD21–2 and 23CR–3 are open, down time lamp 67 is illuminated since contact TD21–3 is closed, signal 68 continues to sound since contact TD21–4 is closed, and a down time trace 75 is produced on the recording tape 72 since contact TD21–5 is opened.

When the attendant assigns a reason for the excessive interval one of signal relays 23CR–28CR is energized to generate a coded plot in a manner to be described and master signal relay 29CR is energized to release timer TD21 and enable it to be reset through the openings of back contact 29CR–1, and to close contact 29CR–2 whereby the down time signal lamp 67 remains illuminated. The dropout of timer TD21 at this time closes its contact TD21–2 in the energizing circuit for production lamp 66 with no effect, opens contact TD21–3 in the down time signal lamp 67 circuit with no effect since the lamp is lighted through contact 29CR–2, opens contact TD21–4 to deenergize the audible signal 68 and closes contact TD21–5 in the plot control circuit without effect at this time. Thus upon the sensing of an excessive production interval, the completion of that interval and the assignment by the attendant of a reason for the excessive interval the audible signal is ineffective, the production lamp signal is extinguished, the excessive interval or down time lamp is lighted and the assigned reason is plotted on record tape 72.

Proper operation of the system dictates that the attendant return contactor 64 to stationary contact 65 deenergizing that signal relay of the group 24CR–28CR which was previously selected, deenergizing master signal relay 29CR and energizing relay 23CR to signal "production." If this is done, the system is returned to its original production state wherein the audible signal remains dormant, production lamp 66 is illuminated by the completion of its circuit between leads 88 and 89 through contacts 23CR–2 and TD21–2. The excess interval or down time signal lamp 67 is extinguished by the opening of contact 29CR–2 while contact TD21–3 is opened and the pen 71 is again displaced to a productive trace 73 on the tape 72 by the closure of contact 23CR–5.

Through oversight the attendant may permit the machine to resume production without resetting the monitor selector contactor 64 to production signal contact 65. Under these circumstances the attendant and supervisory personnel are made aware of this condition by sounding the audible signal 68, extinguishing the down time signal lamp 67, lighting the production lamp 66 and continuing to plot the reason indicated on the selector switch. These functions are performed primarily by the operation of down time production relay 30CR. Under the assumed conditions, when production is initiated, contact 61 closes to energize operation interval relay 21CR. Contact 21CR–3 closes to energize relay 30CR and that relay seals itself in by closing contact 30CR–1 in series with a normally closed contact 23CR–1 of the production signal relay which is not energized under the assumed conditions. Since this set of conditions energizes relay 30CR and relay 23CR is deenergized, production lamp 66 is illuminated through normally closed contact 23CR–3 and closed contact 30CR–2. Down time lamp 67 is deenergized since contact 30CR–3 is opened and the audible signal is sounded by virtue of the closed back contact 23CR–4 and closed contact 30CR–4.

The pen recorder 69 is represented only schematically in the drawings. It can be of conventional form comprising a single pen for a single monitoring station or a plurality of pens having spaced traces across the width of the tape for either a plurality of stations or a plurality of recording functions. The present record is kept by but a single pen marking a single continuous trace. As illustrated in the drawing the pen is normally biased upward as by spring 97, and is displaced downward by solenoid 98 when that solenoid is energized. The solenoid can be energized by a number of circuits shown in the lower portion of FIG. 5. When the machine is on down time the solenoid is deenergized and the trace is displaced upward as shown at 75 by virtue of the tension of spring 97. Thus timing out of timer TD21 to place the monitor down time opens back contact TD21–5 to deenergize solenoid 98. The selection of a signal other than the production signal by the attendant at the work station results in the deenergization of production signal relay 23CR so that contact 23CR–5 is opened to deenergize solenoid 98. However, when the production signal relay is energized and timer TD21 has not timed out, an energizing circuit for solenoid 98 is completed through contacts 23CR–5, 22CR–1 and TD21–5 to displace pen 71 against the tension of spring 97 to a position providing production trace 73. Under these circumstances the energization of solenoid 98 is interrupted periodically by the completion of a manufacturing operation within the allotted time interval and the resultant opening and closing of contact 22CR–1 whereby the force of solenoid 98 is momentarily overcome by the spring tension 97 to produce the production excursions in the trace as at 74.

When the pen is recording down time the reason selected by the attendant is periodically recorded as a group of one to five excursions from the down time base. In the illustration a trace for reason number one is shown in which but a single excursion 76 is produced. This decoding is accomplished by the cams 81–85 which periodically close circuits through the leads 101, 102, 103, 104 and 105 providing alternative energizing paths for solenoid 98 through the relay contacts 24CR–1 through 28CR–1 respectively. Thus, in the assumed condition where the attendant selected reason one by positioning contactor 64 on contact 91 to energize relay 24CR and relay 29CR, the circuit between leads 88 and 89 through lead 99 is opened by open contact 23CR–5. The circuit through lead 101 is partially closed by closed contact 24CR–1. The circuits through leads 101–105 are opened since contacts 25CR–1 through 28CR–1 are opened and the motor 77 rotates shaft 78 since it is connected to its source by the closure of contact 29CR–3. Rotation of shaft 78 closes cam operated contact 111 twice each revolution by virtue of the raised portions 116 on the cam 81 and each closure creates the excursion 76 by energizing solenoid 98. Similarly the paired projections on cam 82 would provide two adjacent excursions from base 75 if contactor 64 were placed on contact 92 to energize relay 25CR and close contact 25CR–1.

The recording system for the reasons selected in the circuits of FIG. 5 can be augmented to include suitable signals such as drop annunciators or illuminated signals. The combination as illustrated comprises a means for monitoring the operation at a work station wherein the initiation of the operation is indicated by closure of switch 61, completion of the operation is indicated by the opening of switch 61 and the closing of switch 63, a standard time interval is indicated by the timer TD21 which is initiated in its definition of the time interval at the beginning of the operation of 21CR and functions to actuate alarms in the forms of lamp 67 and audible signal 68 in the event the operating interval exceeds the defined interval. These alarms continue to function until a selectively operable signal means, the movable contactor 64, is moved to a contact corresponding to the reason for the excessive interval whereupon signal 68 terminates its operation. In addition, the system counts productive cycles by virtue of the trace excursion 74 on tape record 72 and counts cycles deviating from the standard interval by virtue of the transfer from a production trace 73 to a down time trace 75. Further, these traces constitute means to record operations which deviate from the standard interval and by virtue of the excursions 76 from the down time trace 75 record the coded signal which is operated by an attendant at the work station.

Inasmuch as the above described systems lend themselves to numerous modifications and to substitutions of equipment both in the signaling, recording and counting devices and the inter-relation of functions performed by those devices, it is understood that the above described embodiments are set forth merely as illustrative of the invention and are not to be read in a limiting sense.

Having described the invention, I claim:

1. In combination a production rate monitoring system comprising a first switch responsive to the initiation of a manufacturing operation, a timer for defining a given interval, said switch when operated initiating operation of said timer, a second switch responsive to the completion of said manufacturing operation, a first counter responsive to the operation of said second switch prior to the completion of said given interval, a second timer for defining a second interval, means initiating operation of said second timer in response to said first mentioned timer defining the expiration of said first interval, a second counter responsive to the expiration of said second interval prior to the operation of said second switch, and a third timer actuated upon the completion of said second interval for measuring the interval between completion of said second interval and operation of said second switch.

2. A combination for monitoring production to ascertain deviations in the production time interval for a repetitive production operation from a predetermined standard range of time intervals defined by and falling between an initial interval limit and a final interval limit comprising, first means responsive to the initiation of said operation, a first timing means defining said initial interval limit and producing an output a known interval after initiation of and initiated in response to said first means, second means responsive to the termination of said operation, a second timing means producing an output a second known interval after initiation for defining the interval between said initial and final interval limits of said standard range of intervals and initiated in response to the output of said first timing means, a first counter actuated by said second means only when said operation is terminated prior to the occurrence of the output of said first timing means whereby a count is accumulated of production operations of shorter duration than said standard range of intervals, and a second counter actuated by said second means only when said operation is terminated subsequent to the occurence of the output of said second timing means whereby a count is accumulated of production operations of greater duration than said standard range of intervals.

3. A combination in accordance with claim 2 including a third timing means initiated in operation in response to definition of said second interval by said second timing means and terminated by operation of said second means for measuring a third timed interval between the definition of the final interval limit by said second timing means and the operation of said second means responsive to the termination of said production operation whereby the time interval by which each production operation of greater duration than said standard range of intervals is measured, and means to accumulate said measured third time intervals for a plurality of said production operations.

References Cited by the Examiner
UNITED STATES PATENTS

| | | | |
|---|---|---|---|
| 2,407,369 | 9/1946 | Heynisch | 324—103 |
| 2,591,124 | 4/1952 | Boyan. | |
| 3,001,704 | 9/1961 | Lafaurie | 235—92 |
| 3,127,595 | 3/1964 | Coyne | 324—68 |

RUDOLPH V. ROLINEC, *Primary Examiner.*

FREDERICK M. STRADER, *Examiner.*

C. W. HOFFMANN, M. J. LYNCH,
*Assistant Examiners.*